United States Patent [19]

McCutcheon

[11] Patent Number: 4,566,553
[45] Date of Patent: Jan. 28, 1986

[54] AGRICULTURAL WORK VEHICLE

[76] Inventor: Arnold E. McCutcheon, 627 Churchill Dr., Winnipeg, Manitoba, Canada, R3L 1W4

[21] Appl. No.: 647,653

[22] Filed: Sep. 6, 1984

[30] Foreign Application Priority Data

Oct. 17, 1983 [CA] Canada ................................... 439086

[51] Int. Cl.⁴ ............................................ B60K 17/30
[52] U.S. Cl. .................................... 180/237; 180/14.2;
  180/14.6; 180/246; 180/248; 180/142; 180/900
[58] Field of Search ..................... 180/14.2, 14.6, 233,
  180/237, 246, 248, 140, 141, 142, 900

[56] References Cited

U.S. PATENT DOCUMENTS

| | | | |
|---|---|---|---|
| 2,228,454 | 1/1941 | Hamilton | 180/900 X |
| 2,634,663 | 4/1953 | Curtis | 180/900 X |
| 3,154,164 | 10/1964 | Shaw | 180/900 X |
| 3,197,229 | 7/1965 | Houlton | 180/140 X |
| 3,578,096 | 5/1971 | Pearson | 180/14.6 |
| 3,830,325 | 8/1974 | Tarter | 180/14.6 |
| 4,284,159 | 8/1981 | Voelz | 180/140 |
| 4,289,214 | 9/1981 | Spence | 180/900 X |

FOREIGN PATENT DOCUMENTS

| | | | |
|---|---|---|---|
| 1015494 | 10/1952 | France | 180/246 |
| 925255 | 5/1963 | United Kingdom | 180/237 |
| 2081656 | 2/1982 | United Kingdom | 180/237 |

*Primary Examiner*—Harold W. Weakley
*Attorney, Agent, or Firm*—Michael M. Sakovich

[57] ABSTRACT

A four-wheel drive agricultural tractor with independently steered ground engaging wheels supporting a flat, extensible load supportive frame includes an operator's cab that is adapted to face the direction of travel. Mounted under the frame is an internal combustion engine, clutch, and transmission which are individually controllable from the cab. A system of shafts and gears couple motive power from the transmission to pairs of wheels and a system of hydraulic steering motors are controllable from the cab for effecting either coordinated or crab steering. Fabricated of box-girders, the frame includes fixed and slidable portions that are mutually displaceable by hydraulic rams located within the frame to vary the wheelbase and tread of the tractor. The frame also includes an articulated hinged member at each end carrying a hydraulic stabilizer. Both stabilizers are hydraulically interconnected and function to maintain all wheels on the ground while traversing uneven terrain and various novel mounting and locking arrangements are disclosed for attaching and carrying implements on and under the frame.

35 Claims, 23 Drawing Figures

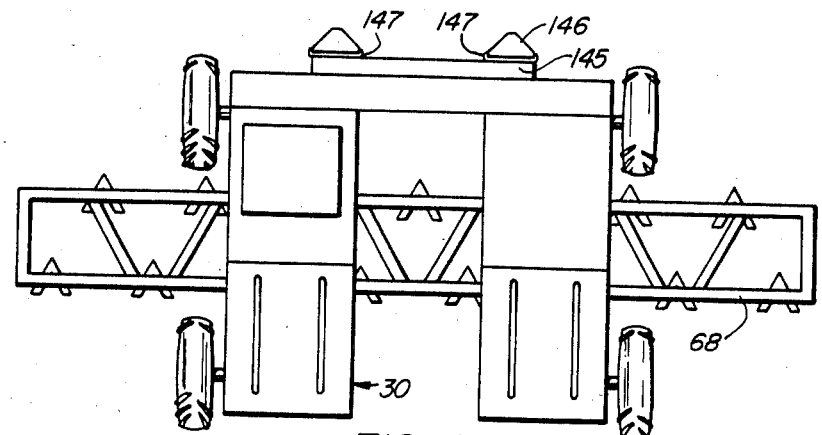
FIG. 12
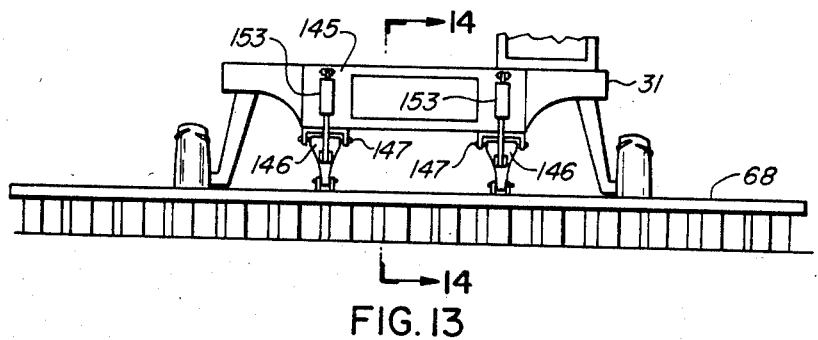
FIG. 13
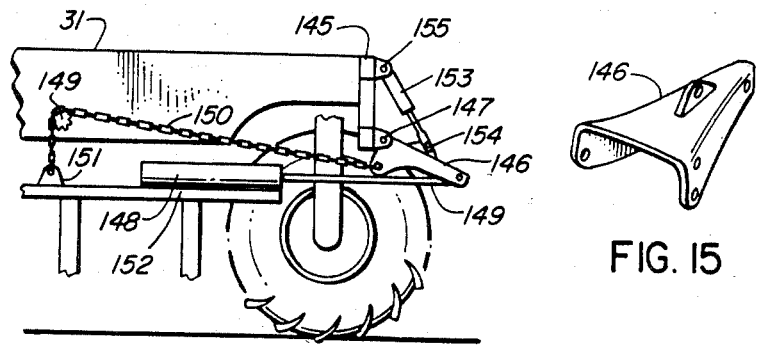
FIG. 14
FIG. 15

AGRICULTURAL WORK VEHICLE

BACKGROUND OF THE INVENTION

This invention relates to an agricultural work vehicle having an extensible and articulate load supportive frame which is particularly adapted to single-handed operations.

In certain general purpose agricultural applications, notably when performing field work from tillage to harvest in wide area, open plain farms, it is known to use tractors and other agricultural work vehicles having adjustable frames from which implements are suspended. Agricultural vehicles of this kind are often equipped with omnidirectional wheels that provide improved mobility in the field. Increasing the wheel base dimension improves ground following ability when working a field and thereby improves work quality and saves time which, in large-scale farming operations, can be substantial.

A corollary to such time saving is the further time that can be saved in those applications where individual farm fields are not conveniently adjacent to one another but are, instead, widely spaced apart and are reached along narrow secondary roads. Speed of manipulating implements, particularly in one-man operations, together with the ability to quickly transport the vehicle from one field to another result in further time savings to improve farming efficiency. In this regard, omnidirectional wheels facilitate broadside farming operations and endwise road transportation of the vehicle and its implements.

A further benefit to be obtained from vehicles having adjustable frames to provide a long wheel base is reduced compaction of soils with lessened inhibition of crop production. In order to maximize production output, permanent earth berms are provided along which the vehicle runs. In those instances where berm spacings may vary from field to field, adjustment of the frame to alter the wheel base will maintain the wheels on the berms so as to avoid extra soil compaction and crop damage.

The advantages afforded by the simple structural features of an adjustable frame and complete wheel control may, moreover, be enhanced when such features are embodied in an agricultural work vehicle with certain other attributes not necessarily found in apparatus of the prior art. In particular, reference is made to cost effectiveness in manufacture and use, simplicity of design, convenient single-handed operation and vehicle durability.

SUMMARY OF THE INVENTION

Having regard to the foregoing criteria, a principle object of the present invention is the provision of an agricultural work vehicle that is omnidirectional and which includes a frame that is longitudinally and laterally extensible.

Another provision of the invention is such a vehicle that employs a box-girder frame construction which provides light weight combined with improved strength for carrying and towing substantial loads.

Another provision of the invention is such a vehicle having articulated frame members that provides improved working of the soil and crops as a result of following the contours of terrain more closely.

Still another provision of the invention is an agricultural work vehicle that is energy efficient as a result of its lighter weight and which with its equipment is more economical to produce.

Still another provision of the invention is such a vehicle having improved road maneuverability due to its lighter weight while retaining tractive efficiency by virtue of the weight carrying capability of its frame which transmits to the wheels the weight of apparatus carried together with suction forces set up by ground engaging implements suspended from the frame.

Another provision of the invention is such a vehicle having a frame with a load supporting central portion that is adjustable in width to securely accomodate containers for carrying supplies of liquid or dry material to be spread on the soil.

Yet another provision of the invention is such a vehicle that is adapted to be readily disassembled and reassembled to facilitate shipment to user destinations.

Problems commonly associated with the aforedescribed apparatus of the prior art may be substantially overcome and the aforenoted provisions of the invention achieved by recourse to my agricultural work vehicle having an extensible load supportive frame, an operator's cab rotatably mounted on the frame and adapted to face the direction of travel, motive power means carried by the frame and ground engaging wheel means selectively controllable from the cab and drivable by the power means for rollably supporting the frame and which comprises, a fixed frame member having a coplanar first sleeve portion, a slidable frame member having a longitudinal arm portion adapted to slidably engage the sleeve, an articulated frame member hingedly connected with individual ones of the fixed and slidable frames in the plane of the sleeve and extending orthogonally thereto and hydraulic ram means controllable from the cab for interconnecting and mutually displacing the fixed and slidable frame members thereby altering the dimensions of the frame.

DESCRIPTION OF THE DRAWINGS

The invention will now be more particularly described with reference to embodiments thereof shown, by way of example, in the accompanying drawings wherein:

FIG. 12 is a top plan view of an agricultural work vehicle according to the present invention showing an agricultural implement positioned under the vehicle frame;

FIG. 13 is a fragmentary front elevation view of the vehicle and implement of FIG. 12;

FIG. 14 is a fragmentary view taken along the lines 14—14 of the vehicle shown in FIG. 13;

FIG. 15 is a perspective view of a drawbar bracket illustrated in FIG. 14;

DESCRIPTION OF THE ILLUSTRATED EMBODIMENTS

Figure 1:
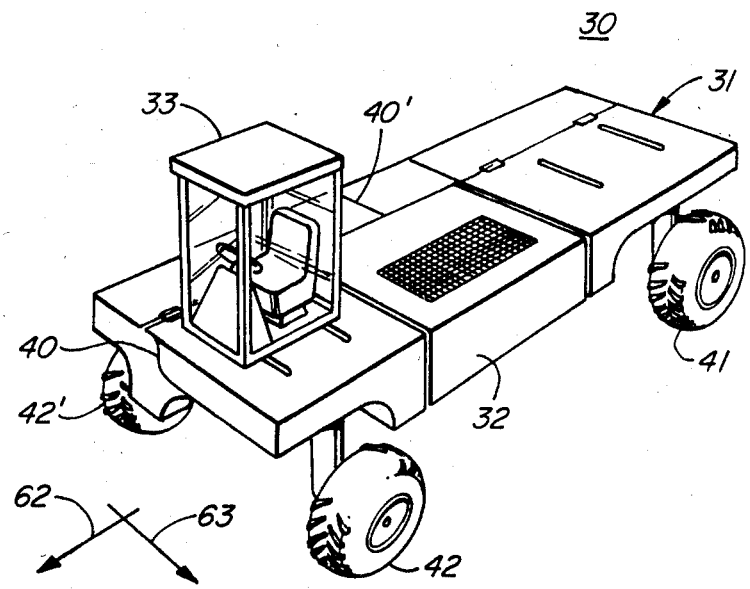
FIG. 1 is a perspective view of an agricultural work vehicle in accordance with the present invention.

A perspective view in FIG. 1 of an agricultural work vehicle 30 represents the best mode contemplated for carrying out the invention to which this vehicle relates. As may be best seen in FIG. 3, the vehicle 30 includes an extensible load supportive frame 31 which, in accordance with FIG. 1, is enclosed within a body of sheet metal construction that comprises a plurality of individual panels 32, some of which are overlapped, as at 40 and 40', to accomodate dimensional changes in the frame.

An operator's cab 33 is rotatably mounted on the frame 31 and is adapted to face the direction of travel of the vehicle. In this regard, the cab mounting arrangement is not illustrated but would comprise, typically, a known arrangement of a slotted track mounted on the frame 31 with corresponding wheels mounted on the underbody portion of the cab and rollably engaging the slot in the track in captive relation to hold the cab in position. Additionally, a known detent mechanism (not shown) would be employed to retain the cab in any selected position.

Figure 2:
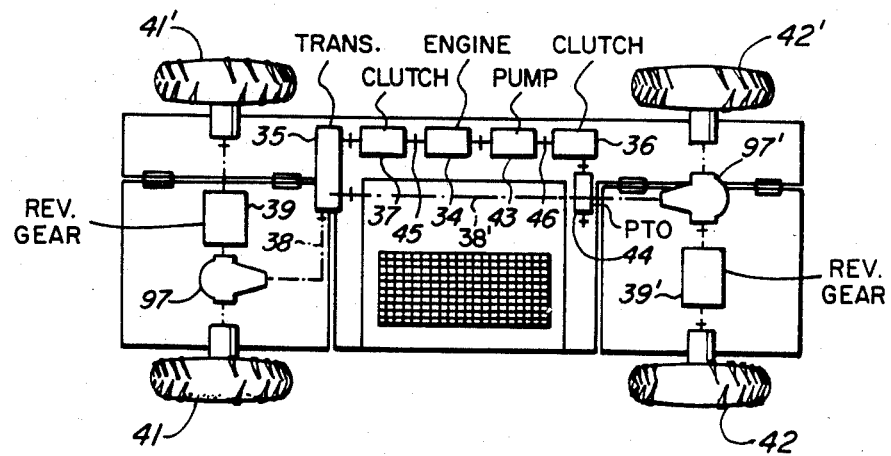
FIG. 2 is a bottom plan view of the vehicle of FIG. 1.

Motive power means for the vehicle 30 is typically an internal combustion engine 34 mounted under the frame 31 as illustrated in FIG. 2. FIG. 2 further illustrates diagramatically a drive clutch 37 that is coupled to an output shaft 45 of the engine 34 which, it will be understood, is operably controllable from the cab 33. Moreover, an auxilliary clutch 36 is likewise operably controllable from the cab 33 for selective connection with a second output shaft 46 of the engine 34. The motive drive train is completed by drive shafts 38 and 38' which couple motive power from the clutch 37 to separate pairs of wheel assemblies 41, 41' and 42, 42' through a transmission 35, differential gear cases 97 and 97', and reverse gears 39 and 39'.

Also mounted under the frame 31 is a hydraulic pump 43 shown coupled to the shaft 46 as well as a power take off unit 44 that is shown coupled to the clutch 36.

While not indicated in FIG. 2 it will be understood that the drive shafts 38 and 39 are extensible to the same degree as is the frame 31. This is an obvious requirement in view of the relative movement between the frame portions, one of which carries the engine 34, transmission 35, and clutches 36 and 37. Alternatively, a separate engine, transmission and clutch may be used for each wheel pair 41 and 42 in which case the separate engines could be synchronized to provide uniform power output to the separate wheel pairs, or separately controllable to compensate for yaw in side-hill tillage.

Figure 3:
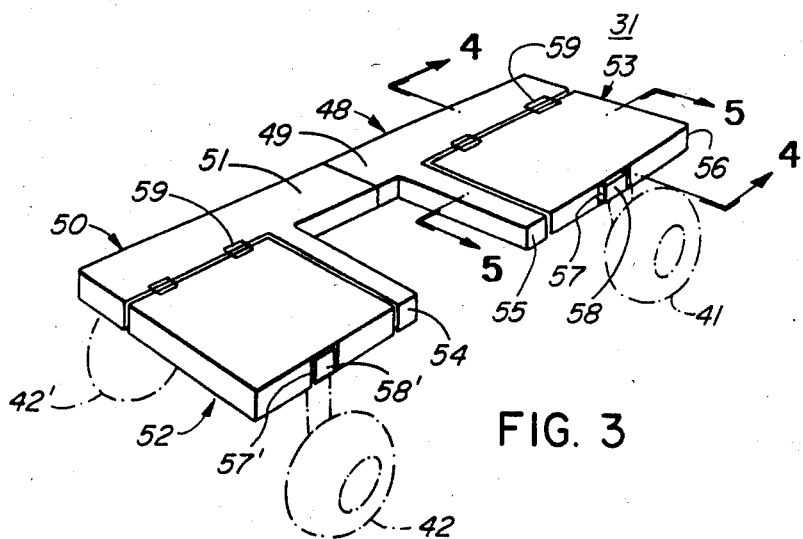
FIG. 3 is a perspective view of a load supportive frame of the vehicle of FIG. 1.

The frame 31 illustrated in FIG. 3 is preferably of a box-girder construction which provides lightness of weight together with substantial load supportive strength. Moreover, this form of construction is compatible with the frame 31 which comprises a fixed frame member 48 having a coplanar sleeve portion 49, a slidable frame member 50 having a longitiudinal arm portion 51 adapted to slidably engage the sleeve and a pair of articulated frame members 52 and 53 that are connected by means of hinges 59 to individual ones of the members 50 and 48, respectively. It will also be noted that the members 52 and 53 extend orthogonally to their respective joined members 50 and 48 to provide the frame 31 with ends that are relatively large and unobstructed for carrying the cab 33 as well as any specialized apparatus to be carried by the vehicle.

As regards the apparatus carrying capability of the vehicle 30, it will be noted in FIG. 3 that the members 50 and 48 individually further comprise an orthogonally extending frame member 54 and 55, respectively, which is disposed alongside corresponding articulated member 52 and 53, respectively, to define a load supportive central portion that is adjustable in width.

Each one of the members 52 and 53 is similar to other portions of the frame 31 in that a box-girder style of construction is employed to provide light weight with strength. In keeping with this style of construction, FIGS. 3 and 4 reveal a top wall 54 and a bottom wall 60 together with side walls 56 that define a central coplanar sleeve portion 57 which is adapted to slidably receive a lateral extension frame member 58 in each one of the members 52 and 53.

Figure 4:
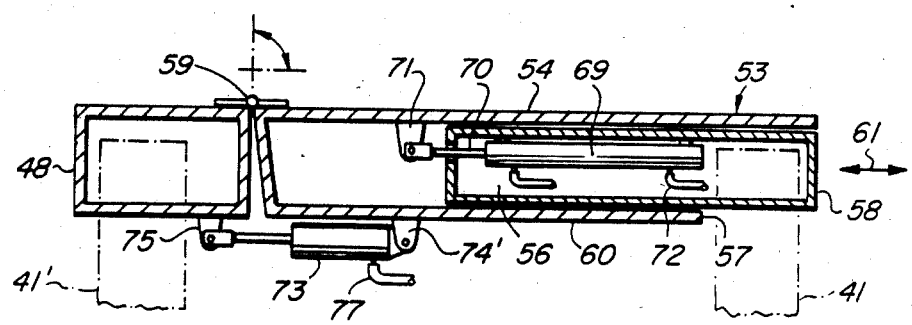
FIG. 4 is a cross-sectional view of the frame of FIG. 3 taken along the lines 4—4.
Figure 10:
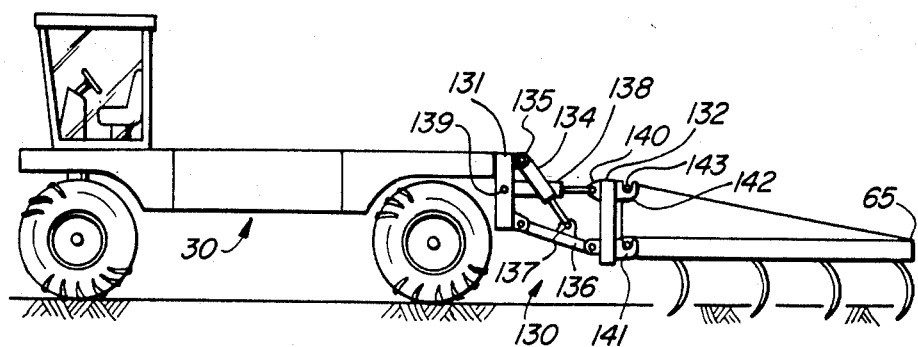
FIG. 10 is a side elevation view of an agricultural work vehicle according to the present invention shown hitched in a towing mode to an agricultural implement.
Figure 11:
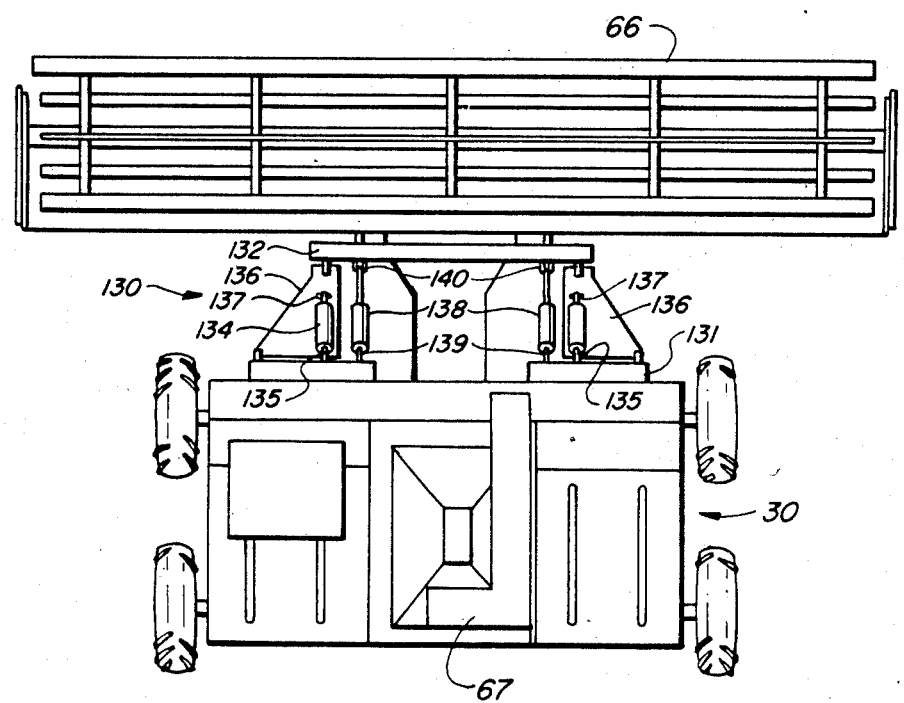
FIG. 11 is a top plan view of an agricultural work vehicle according to the present invention shown hitched broadside to an agricultural implement.

FIG. 4 reveals in a cross-sectional view the member 58 retracted in its sleeve 57. A double headed arrow 61 indicates that the member 58 may be extended or retracted to permit the frame 31 to alter its overall dimension in width as well as in length. Thus, by completely retracting the members 58 as illustrated in FIGS. 3 and 4, the vehicle 30 is adapted to its transport load for endwise travel as indicated by an arrow 62 in FIG. 1. In this mode, the vehicle 30 presents a minimum width for safe travel along a roadway. Conversely, with the mutual extension of members 48 and 50 combined with a 90° rotation of the wheels 41 and 42, hereinbelow to be described in greater detail, the vehicle 30 is set to its field mode for broadside travel, indicated by an arrow 63, as when working a field. Reference to FIG. 10 shows the vehicle 30 arranged in its transport mode and hitched to an implement 65. FIG. 11, on the other hand, shows the vehicle 30 in its field mode hitched to a threshing implement 66 and carrying a hopper 67. Similarly, FIGS. 12 and 13 show the vehicle 30 in its field mode carrying a mid-mounted cultivator implement 68.

An hydraulic ram means for extending and withdrawing the member 58 is shown in FIG. 4 as comprising a hydraulic cylinder 69 attached to an inner surface of a side wall of the member 58 and a piston rod 70 extending through an aperture in an end wall of the member 58 with the free end of the rod anchored to the inner surface of the wall 54 at a bracket 71. Hydraulic lines 72 conduct hydraulic fluid to the cylinder 69 under control of solenoid actuated valves (not shown) which are electrically controllable from the cab 33.

Figure 6:
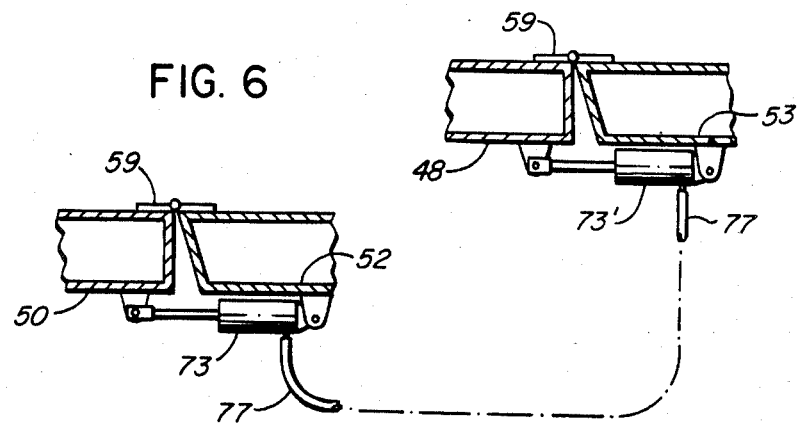
FIG. 6 is a fragmentary cross-sectional view taken along the lines 4—4 of the frame of FIG. 3 and shows the interconnection of a hydraulic ram disposed within the frame.

Hydraulic stabilizer means interconnected between members 53 and 48 and also between members 52 and 50 are shown in FIGS. 4 and 6. FIG. 4 typifies such hydraulic stabilizer means at each end of the frame 31 and illustrates a hydraulic cylinder and rod assembly 73 which is pivotally connected between a bracket 74 that is attached to the outer surface of the wall 60 and a bracket 75 which is affixed exteriorly of the member 48. Observe that one end of the member 53 is sloped to permit a greater swing about the hinge 59.

A pair of corresponding assemblies 73 and 73' are shown in FIG. 6 as being interconnected by a coiled hydraulic line 77. The hydraulic stabilizer means of FIG. 6 functions to maintain all of the wheels of the vehicle 30 in ground contact while the vehicle traverses uneven terrain. For example, should the member 53 be forced upwards a predetermined amount, the corresponding member 52 will move downwardly by the same amount. This is accomplished by the flow of hydraulic fluid between assemblies 73 and 73' which transfers movment between the members 52 and 53. Note that the line 77 is made sufficiently long to accomodate the greatest extension of the frame 31.

Figure 5:
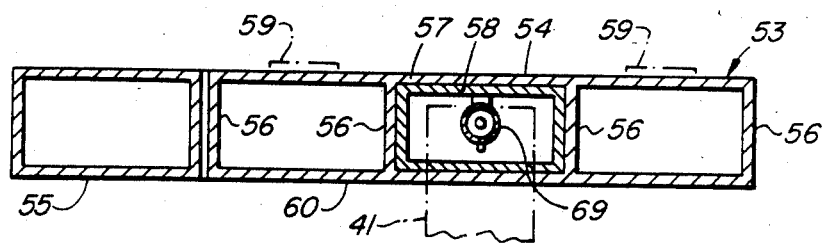
FIG. 5 is a cross-sectional view of the frame of FIG. 3 taken along the lines 5—5.

A cross-sectional end view of the member 53 is illustrated in FIG. 5 which shows the sleeve 57 and the member 58 slidably fitted therein. In addition, it will be noted how the cylinder 69 is affixed interiorly of the member 58. The box-girder form of construction is clearly evident and is exemplified by the coplanar arrangement of the cross-sections of the members 55 and 53, with the latter being defined by three coplanar and adjacent box girders sharing mutual top and bottom walls 54 and 60, together with several side walls 56 which define the sleeve 57 and close in the sides of the member 53.

Figure 7:
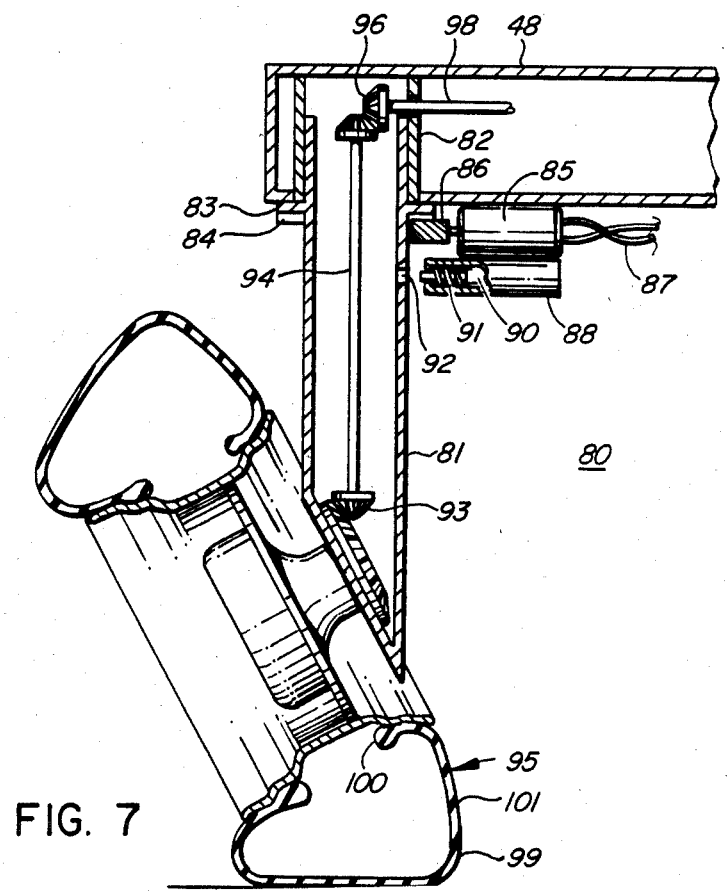
FIG. 7 is a fragmentary cross-sectional view of one embodiment of a wheel assembly usable on the vehicle of FIG. 1.
Figure 8:
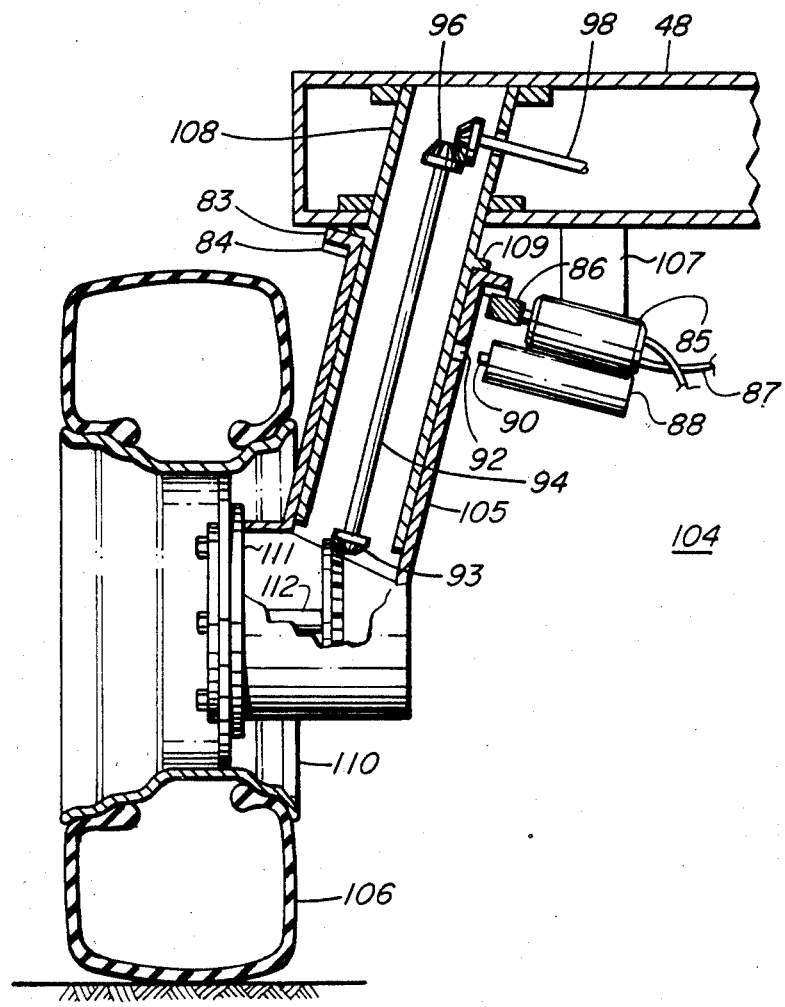
FIG. 8 is a fragmentary cross-sectional view of another embodiment of a wheel assembly usable on the vehicle of FIG. 1.
Figure 9:
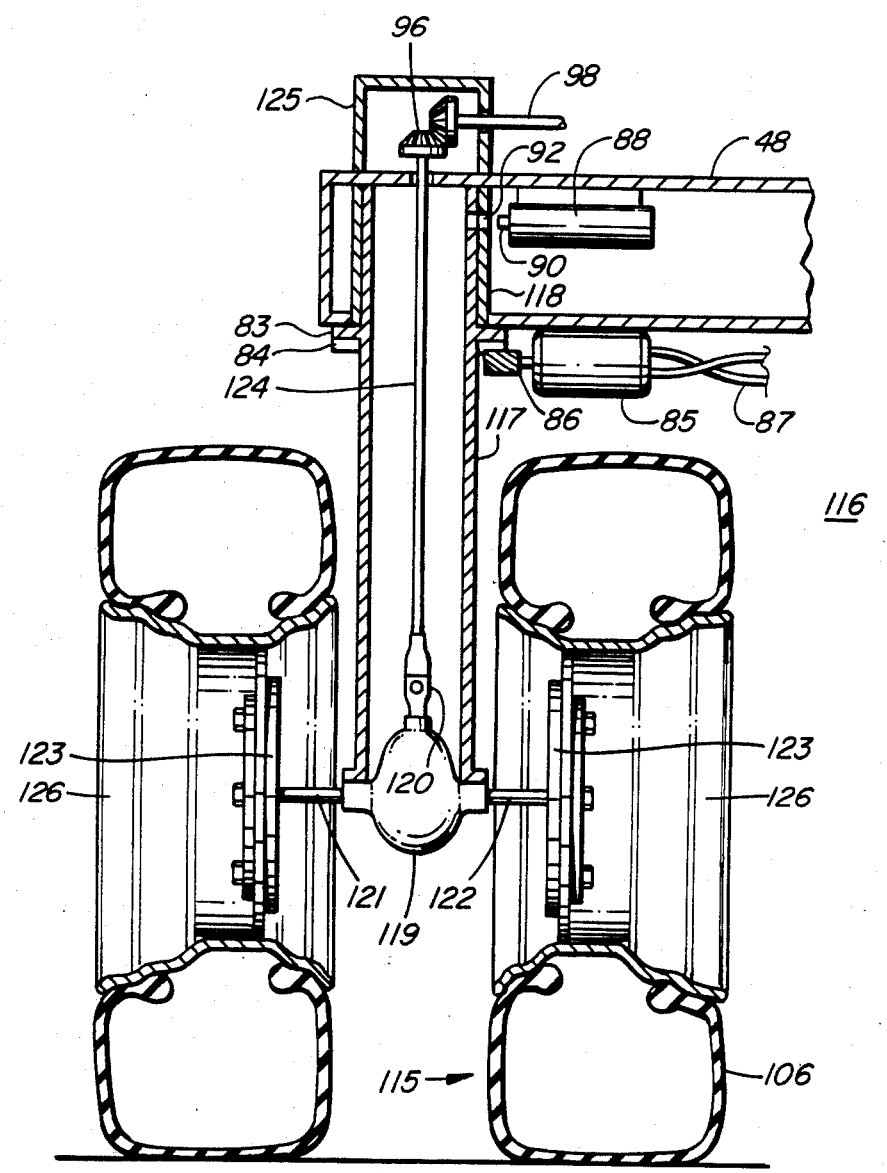
FIG. 9 is a fragmentary cross-sectional view of yet another embodiment of a wheel assembly usable on the vehicle of FIG. 1.

Three separate wheel embodiments are illustrated in FIGS. 7, 8 and 9 where like structural features are numerically designated in a like manner. As a matter of convenience, each of the wheels shown are described as being mounted on the member 48 at the intersection of the long axes of the sleeves 49 and 57. Although not illustrated, it will be understood that a corresponding wheel mounted on the member 50 would similarly be mounted at the intersection of the long axes of the sleeves 49 and 57'. The remaining two wheels would each be mounted on the members 58 and 58' adjacent the free ends thereof as indicated in broken line form in FIG. 4. Having regard to FIGS. 3 and 4, and to the sliding features of the frame members shown therein, it may be readily seen how the wheel base and the tread of the vehicle 30 may be selectively altered for any given operating condition. For example, the vehicle wheel base would be increased to its maximum dimensions when advancing broadside as when working a field. Alternatively, the tread dimension would be made as short as possible for endwise operation of the vehicle as when using public roads. A third example is where the wheel base and tread dimensions are made substantially equal in order to provide maximum stability for the vehicle 30 when traversing rough terrain.

Referring now to FIG. 7, a wheel assembly 80 is shown to comprise a hollow wheel strut 81 that is rotatably journalled in a bearing 82 that is disposed interiorly of the member 48. A circumferential bearing flange 83 is mounted on the strut 81 in abutting and slidable relation with a corresponding portion on the member 48. A sector gear 84 is mounted in intimate contact with the flange 83 with the gear teeth thereof extending downwardly.

Steering control of the strut 81 is effected by means of a hydraulically driven steering motor 85 that is remotely controllable from the cab 33. As shown in FIG. 7, the motor 85 is attached to the member 48 in proximity of the gear 84 such that a worm gear 86 affixed to an output shaft of the motor 85 is in engagement with the gear 84. Under control of solenoid valves, hereinbelow to be described, pressurized hydraulic fluid is applied through a pair of hydraulic lines 87 to drive the motor 85, thereby steering the assembly 80.

Attached to the motor 85 is a wheel lock solenoid 88 which reveals, in a cut-away portion, a slidable plunger 90 having a return spring 91. A series of apertures 92 are formed in the strut 81 in line with the plunger 90 and are engagable thereby under remote control from the cab 33 to lock the assembly 80 into predetermined positions.

The lowermost end of the strut 81 is closed off to form a gear case containing crown and pinion gears shown as a pair of bevelled gears 93 to which is attached a wheel strut drive shaft 94 and a wheel 95. The shaft 94 leads upwardly to a second pair of bevelled gears 96 which effect a directional change and are connected to the differential gear case 97 by way of a drive shaft 98.

Being fully enclosed, the gear and shaft arrangement shown in FIG. 7 is advantageous from the viewpoint of safety and increased service life. Access panels disposed on the member 48 and the strut 81 although not shown in FIG. 7 are normally provided to facilitate maintenance and repair work.

A cross-sectional view of a tire 99 reveals a novel structure of a tire having beads 100 and side walls 101 that are of unequal length. The tire arrangement shown allows a vertical pivot about the strut 81 and permits the load carried by the tire to be centered directly above its ground engaging contacting surface. As shown in FIG. 7, the tire 99 is adapted to run flat.

Another wheel assembly 104 similar to that of FIG. 7, appears in FIG. 8 wherein it will be understood that a hollow wheel strut 105 is inclined 6° outwardly as indicated in FIG. 8. Although not shown, it will be further understood that the strut 105 is tilted 6° forwardly. These inclinations have been embodied for two reasons:

(i) To allow the steering point to intersect the ground at a point close to the center of the ground engaging area of a tire 106. This results in minimal rotation of the tire 106 when steering with the vehicle 30 stopped.

(ii) The compound angle resulting from the foregoing inclinations allows the tire 106 to be nearly vertical when in either the broadside or endwise mode.

Similarities in the wheel assembly 80 of FIG. 7 and the wheel assembly 104 of FIG. 8 may be seen in the arrangement of the flange 83 and the gear 84 mounted thereon for operational engagement with the gear 86 of the motor 85. In addition, the solenoid 88 is attached to the motor 85 such that the plunger 90 is in aligned relation with the apertures 92 for locking the wheel in a predetermined position.

Differences in the wheel embodiments of FIG. 7 and 8 occur mainly as a result of the inclination in the strut 105. Thus, a mounting bracket 107 is required to position the motor 85 with respect to the gear 84. The journal arrangement for the strut 105 also differs by the feature of an inclined strut journal 108 having one end fixedly mounted interiorly of the member 48 with an extending outer end adapted to function as a journal for the strut 105. To this end, a circumferential bearing flange 109 is disposed on the journal 108 just below the member 48 to provide unobstructed rotational engagement with the flange 83.

The gears 93 and 96, together with their respective shafts 94 and 98 are virtually unaffected by the angled position of the strut 105 since it is only the angle of the gear faces that has to be altered somewhat to compensate for this change. Accordingly, the gears and drive shafts remain enclosed within the struts and frame members as indicated in FIG. 8.

The tire 106 is of conventional design as is a rim 110 on which the tire is mounted. The rim 110 is fastened in a conventional manner to a mounting flange 111 which is attached to a wheel axle 112 that extends outwardly of the gears 93.

Dual wheels 115 are employed in the wheel assembly 116 of FIG. 9. More soil compaction occurs as a result of the two wheels but this disadvantage may be considered acceptable under conditions where exceedingly soft soils prohibit the use of a single tire that may sink excessively.

Extending orthogonally from a member 48, a cylindrical, hollow wheel strut 117 is rotatably journalled interiorly of the member 48 within a journal 118. As in the embodiment of FIG. 7, the bearing flange 83 slidably engages a corresponding portion of the member 48.

Rotation of the strut 117 follows in the same manner as previously described by means of the gear 84 which is driven by the gear 86 of the motor 85 as a result of pressurized hydraulic fluid controllably applied to the lines 87.

A wheel lock arrangement is similar to that previously described, using the solenoid 88 which is mounted interiorly of the member 48 and is positioned so that the plunger 90 is engageable with apertures 92 in the strut 117.

The lowermost portion of the strut 117 is closed by a differential gear case 119 which includes an input comprising a stub shaft 120 and two outputs comprising wheel axles 121 and 122 each having flanges 123 to which the rims 126 are conventionally fastened.

Extending coaxially with the strut 117, a drive shaft 124 is connected to a pair of bevelled gears 96. The drive shaft 98 leads from the gears 96 to the differential gear case 97.

Unlike the embodiments of FIGS. 7 and 8, the drive shaft illustrated in FIG. 9 is disposed externally of the member 48. However, the gears 96 are enclosed by means of a rigid cover 125 for safety reasons.

Referring next to FIGS. 10 and 11, the vehicle 30 is shown hitched to implements 65 and 66 by means of an articulated hitch 130. The hitch 130 may be used for either side or end mounting of implements and comprises a mounting frame 131 for attachment to the vehicle 30, a draw bar and lift frame 132 for releasable attachment to an implement, and a plurality of hydraulic rams which are pivotally linked between the frames 131 and 132.

Considering only one side of the hitch 130 as it is illustrated in FIG. 10, it will be observed that a hydraulic ram 134 has one end pivotally joined to the frame 131 at a connection 135. The other end of the ram 134 is similarly pivotally joined to a bar link 136 at a connection 137. It will be observed in FIG. 11 that the link 136 is generally triangular in shape, having a wide base that is pivotally attached to the frame 131 to minimize side sway of the implement. Another hydraulic ram 138 is adjacent to ram 134 and is pivotally connected between the frames 131 and 132 at pivotal connections 139 and 140, respectively, fortilting the implement 65 90° for road transport.

As may be best seen in FIG. 10, a pair of laterally spaced lower hooks 141 and a corresponding pair of upper hooks 142 are mounted on the frame 132. The hooks 141 and 142 are arranged to engage corresponding lugs 143 on the implements 65 and 66. The hooks 141 are self locking to ensure that the implement is held in position on the frame 132. This necessitates manual disengagement by the operator when changing implements but not when the implement is engaged by remote control from the cab 33.

FIGS. 12, 13 and 14 each show a hitch arrangement for hitching and lifting a mid-mounted cultivator implement 68 under the frame 31. The hitch arrangement is shown to include a mounting frame 145 for broadside attachment to the frame 31 of the vehicle 30. A pair of laterally spaced drawbar brackets 146 are shown in FIGS. 12 and 13 mounted on the free side of the frame 145. Each bracket 146 is provided with a wide end that is pivotally connected to the frame 145 at connections 147. The wide side of each bracket 146 is purposely designed in this manner to improve the stability of the implement by minimizing side sway. This feature is shown in FIG. 15 which also indicates that the bracket 146 has a narrow end for pivotal connection to a drawbar 148 having an extensible draft link 149 that is pivotally attached to the narrow end of the bracket 146.

The fragmentary side elevation view of FIG. 14 illustrates one side of the mid-mounting hitch arrangement, there being required two sides as indicated in FIG. 13. A sheave 149 is rotatably mounted on the frame 31 in spaced relation with individual ones of the brackets 146. One end of a chain 150 is joined to the wide end of the bracket 146, the other end of the chain being entrained about the sheave 149; depending therefrom to a connection 151 on a beam 152 of the implement 68. Intermediate the bracket 146 and the frame 145 a hydtaulic ram 153 is pivotally connected at connections 154 and 155, respectively.

When effecting mid-mount coupling, such coupling is facilitated by driving the vehicle over the implement 68 in an endwise manner, stopping in line with the drawbars 148 and pulling out the links 149 for attachment to the brackets 146. Both chains are then attached to the beam 152. Actuation of the rams 153 then adjusts the depth of the implement 68 when working in fields or lifting the implement for transport.

The vehicle 30 often carries apparatus such as a combine body, a seeder tank, spray tank or a pallet box, to name but a few examples. On such occasions the central panel 32, which is shown in FIG. 1, is removed and the frame 31 is adjusted in length to bring members 54, 55 into adjacent relation wth the sides of the apparatus to be carried. Lift rail apparatus 160, operably mounted on the members 54, 55, is then remotely controllable from the cab 33 to lift and hold the apparatus to be carried.

Figure 16:
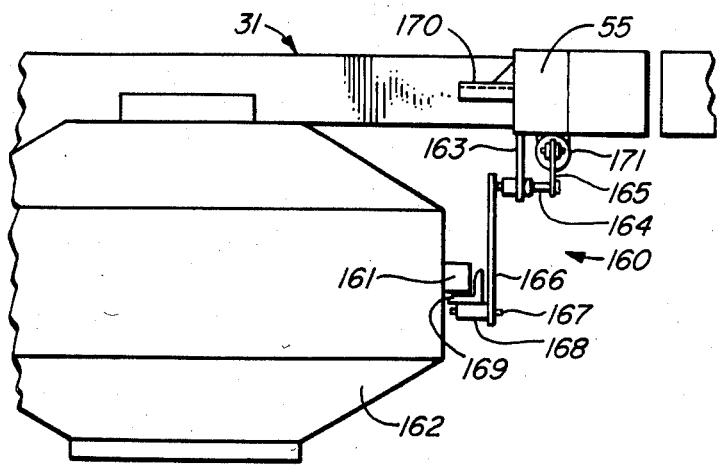
FIG. 16 is a fragmentary end view showing a container suspended by a lift rail in an agricultural work vehicle of the present invention.

FIG. 16 shows one apparatus 160 mounted on the member 55, there being two such items of lift rail apparatus mounted on the member 55 to liftably engage a pair of parallel side frames 161 of which only one such side frame is shown mounted on a side wall of a tank 162. Having regard to this figure, it will be understood that the apparatus 160 includes a pair of fixed brackets 163 which depend in spaced lateral relation from individual ones of members 54, 55. Adjacent to the free end of each bracket 163, there will be seen rotatably journalled therein a pivot shaft 164 that is rotatably connected at one end by means of a toggle link 165 to a hydraulic ram 171 that is likewise mounted on the member 55. A hanger strap 166 is fixedly attached to the shaft 164 and depends therefrom. A pivot shaft 167 is fixedly secured to a free end of each strap 166 in parallel relation with the shaft 164. Each shaft 167 is rotatably journalled in a bearing 168 that is attached to and forms part of an angle beam 169. It will be understood from FIG. 16, that each beam 169 faces the side frame 161 in order to engage such frame whereby the tank 162 may be lifted and carried by remotely energizing the ram 171 from the cab 33. To ensure that the frames 161 remain on the beams 169 when the tank is raised, the end of each frame 161 facing outwardly of the frame 31 is brought into engagement with a retainer bracket 170 attached to the member 55.

Figure 17:
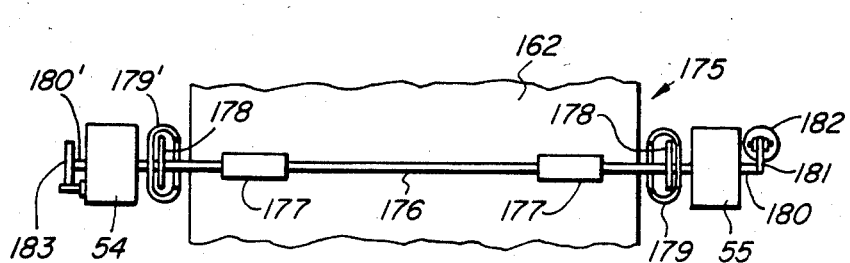
FIG. 17 is a fragmentary end view of the container of FIG. 16 showing apparatus for locking the container to the frame of an agricultural work vehicle of the present invention.

A different locking apparatus used to securely connect the tank 162 to the frame 31 is illustrated in FIG. 17 and comprises locking apparatus 175 which is disposed separately on the tank 162 and the members 54 and 55. In this arrangement, the apparatus 175 ties together the members 54 and 55 to form a strong box-like structure.

FIG. 17 illustrates a locking rod 176 that is rotatably journalled in a pair of bearings 177 that are afixed to the exterior surface of a vertical side wall of the tank 162. Each free end of the rod 176 has attached thereto a wedge shaped lock member 178 which is best seen in FIG. 18a.

A correspondingly shaped lock receiver 179 is connected to one end of a short shaft 180, the other end of which is affixed to a link 181 that is pivotally attached to a hydraulic ram 182. Note that the shaft 180 is rotatably journalled in the member 55.

At the member 54, the receiver 179' is correspondingly attached to a shaft 180', the other end of which is connected to a detent mechanism 183 that is adapted to hold the receiver 179' in a predetermined locking position.

Figure 18A:
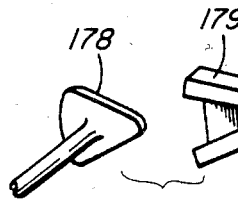
FIGS. 18a, b, c, are perspective views of a portion of the locking apparatus shown in FIG. 17.
Figure 18B:
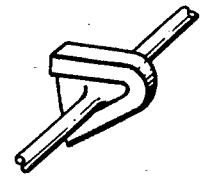
Figure 18C:
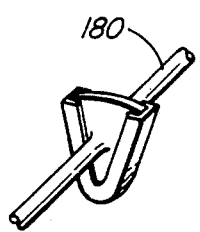

The ram 182 is remotely controllable from the cab 33 and FIG. 18 illustrates the various positions through which the members 178 and receivers 179 progress when locking the tank 162 to the frame 31. In the first step, as indicated in FIG. 18a, the member 178 is aligned with the receiver 179. In FIG. 18b, the member 178 has been advanced into complete contact with the receiver 179, the member 178 sliding into and nesting with the receiver 179 as a result of their respective wedge shapes. Finally, in FIG. 18c the shaft 180 is rotated 90° carrying the receiver 179 and its nested member 178 into a locked condition with the weight of the tank 162 ensuring that the member 178 and receiver 179 remain engaged. A reversal of the steps hereinabove recited will permit withdrawal of the member 178 from its receiver 179 and subsequent unlocking of the tank 162 from the frame 31.

Figure 19:
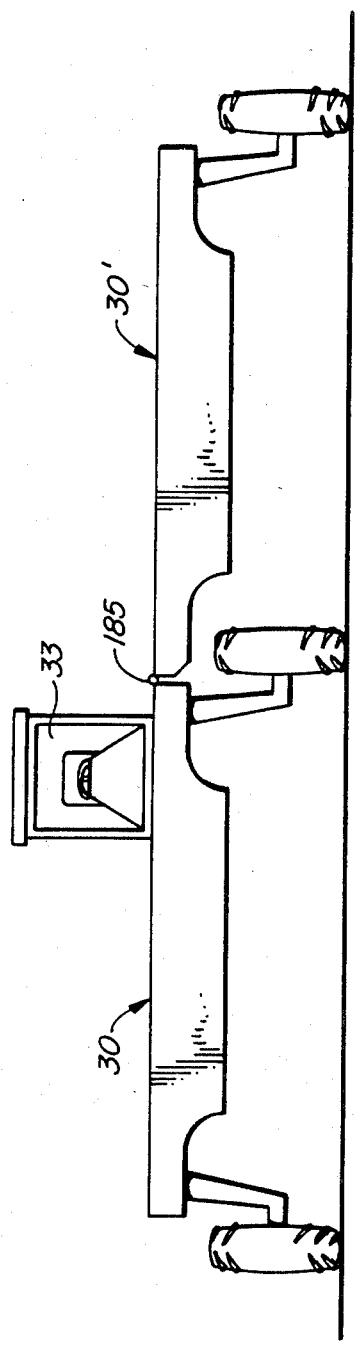
FIG. 19 is an end elevation view of an agricultural work vehicle according to the present invention shown joined by means of a hinge to a second vehicle.

When working large, open areas, commonly referred to as broadacre farming, it is advantageous to couple one and possibly two additional slave vehicles to a master vehicle in order to work as large an area as is practicable in a single sweep. This feature is illustrated in FIG. 19 which shows a vehicle 30 that is attached by means of a hinge 185 to a two-wheeled slave vehicle 30'. The purpose of the hinge 185, of which there would be at least two spaced in lateral relation along the junction of the two vehicles, is to provide firstly a flexible joint that permits a more uniform working of the soil and/or crops by permitting the combined vehicles to follow the soil contours more closely. Secondly, each one of the hinges 185 has incorporated in the stucture thereof a strain gauge to measure stresses set up in the hinges by the vehicle 30' as it either leads or lags the master vehicle 30. In the embodiment illustrated in FIG. 19, it is proposed that the slave vehicle 30' be provided with its own internal combustion engine (not shown), the speed of which would be automatically controlled from a control circuit disposed in the cab 33. Manual engine controls would also be provided to facilitate U-turns at field ends.

Figure 20:
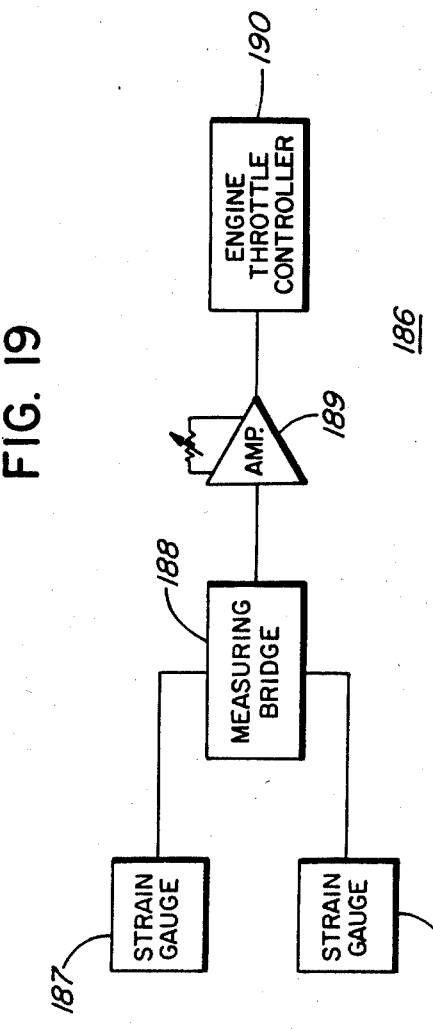
FIG. 20 is a block diagram illustrating a control circuit for regulating the engine speed of the second vehicle of FIG. 19.

A block diagram illustrating a circuit 186 required to effect automatic engine control for the embodiment of FIG. 19 is illustrated in FIG. 20. Thus, strain gauges 187 and 187' at the hinges 185 are shown with outputs leading therefrom to a measuring bridge 188. The bridge 188 is conventional in design and generates a composite signal which is responsive to input signals thereto from the gauges 187 and 187'. An output from the bridge 188 is applied to an operational amplifier 189 to produce a control signal in response to the composite signal input thereto. An engine throttle controller 190 has an input thereto to which the control signal is applied. The circuit 186 thus functions as a feedblack device to increase the engine speed of the vehicle 30' when it lags the vehicle 30 and, conversely, to decrease the enine speed of the vehicle 30' when it leads the vehicle 30. In this regard, the circuit 186 attempts to achieve and maintain a minimum strain in the hinges 185.

Figure 21:
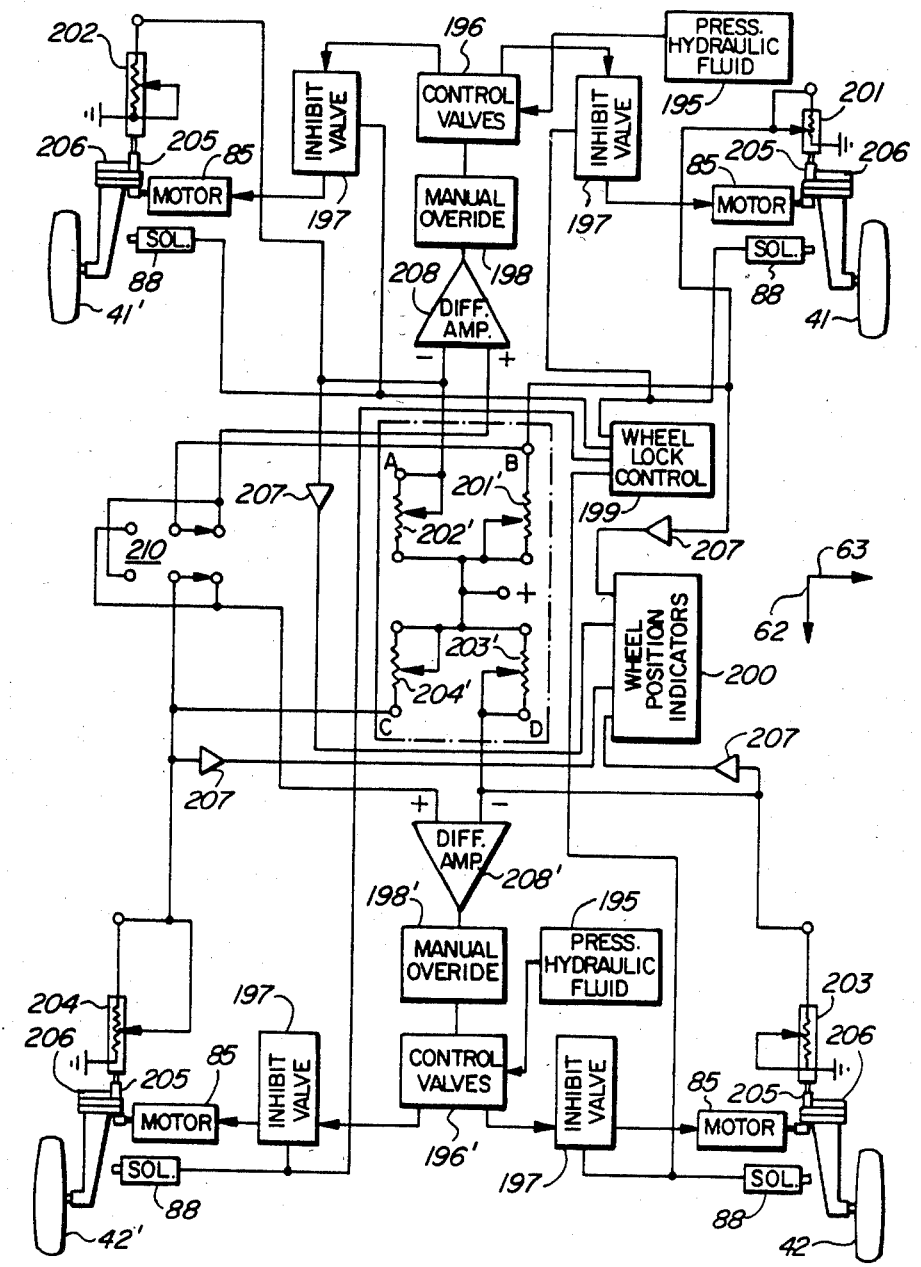
FIG. 21 is a combined pictorial and block diagram of a wheel steering system for the vehicle of FIG. 1.

Steering controls and locks have been described briefly for wheel assemblies 80, 104 and 116. An overall system of steering control in this regard is shown in FIG. 21 with reference being made to the vehicle 30 of FIG. 1 to define numerical designations for the wheels and the directions of travel as indicated by the arrows 62 and 63. Motive power for the motors 85 is obtained from a source of pressurized hydraulic fluid 195 which is controllably applied to individual ones of the motors 85 by way of a main control valve 196 and a serially connected inhibit valve 197. In a manual control mode, a manual override control 198 selectively operates the valve 196 to operate individual ones of the motors 85 and consequently to steer corresponding ones of the wheels 41 and 42.

Steering locks on the wheels 41 and 42 have been similarly described but in terms of a single wheel only. FIG. 21, on the other hand, illustrates the overall lock control system for the vehicle 30. It will be observed therein that individual ones of the solenoids 88, together with a corresponding inhibit valve 197, are selectively controllable by means of a wheel lock control 199. Thus, whenever a solenoid 88 is energized therefrom, its corresponding inhibit valve 197 is similarly energized to block the flow of hydraulic fluid to the motor 85.

Wheel steering position indicators are contemplated as comprising individual meters calibrated in degrees of rotation. A suitable circuit producing a signal corresponding to the rotary position of a single wheel is a multi-turn potentiometer arranged in the circuit configuration illustrated in FIG. 21. Thus, potentiometers 201, 202, 203 and 204, each generate a wheel position signal as a result of being driven by a small spur gear 205 which is in operable engagement with a corresponding ring gear 206 mounted on each wheel 41, 41', 42 and 42'.

The signal taken from each potentiometer is coupled through a buffer amplifier 207 to its corresponding indicator. The same signal from each potentiometer is also applied to one input of a pair of differential amplifiers 208 and 208' as shown.

A corresponding set of four control potentiometers, 201', 202', 203' and 204', are rotatably coupled to a steering column (not shown) of the vehicle 30 to produce steering signals that correspond to the intended steered direction of the vehicle. The arrangement of the potentiometers shown in the circuit of FIG. 21 comprises a conventional bridge circuit for pairs of wheels 41 and 41', 41' and 42', 42' and 42, and 42 and 41. The particular pair of wneel potentiometers that combine with a corresponding pair of steering control potentiometers depends on the position of a double pole double throw switch 210. For example, in the steered direction indicated by the arrow 62, potentiometers 201 and 201' comprise one half of a bridge circuit having its null terminal B connected to a differential amplifier 208. Correspondingly, the potentiometers 202 and 202' comprise the other half of the bridge with its null terminal A connected as shown to the differential amplifier 208. A corresponding arrangement is shown for the wheels 42 and 42'.

In the arrangement described, steering of all four wheels in the same direction is obtained unless the trailings wheels, in this particular case wheels 41 and 41', are locked in a straight ahead position by means of the solenoids 88 and inhibit valves 197. Steering would then be accomplished by means of the leading wheels 42 and 42'. In this event, rotation of the steering wheel causes the potentiometers 203' and 204' to lead their respective wheel potentiometers 203 and 204. This produces an unbalanced condition in the bridge circuit comprising the potentiometers 203, 204, 203' and 204' which is brought back into balance when the wheels 42 and 42' achieve their intended steering angle. Until such time, the unbalanced input of C and D at the differential amplifier 208' results in a control signal ouput that is applied to the valve 196' which energizes the motors 85 of the wheels 42 and 42' to effect steering thereof.

Should it be desired to steer in the opposite direction to the arrow 62, the wheels 42 and 42' would be locked in a straight ahead position and the wheels 41 and 41' unlocked to permit steering by way of the differential amplifier 208 which senses the unbalanced output from its bridge circuit and produces a correction voltage to control the valve 196 which in turn actuates the motors 85 of the wheels 41 ahd 41' to steer in the required direction.

When ordering an abrupt directional change as when going from an endwise direction to a broadside direction which is indicated by the arrow 63, the vehicle 30 would normally be stopped to prevent loss of control or possible damage. Override controls in this regard are not indicated in FIG. 21 but it will be understood that such provision would be made.

With the vehicle 30 at a halt, individual ones of the wheels could be manually controlled by means of the manual override 198 to obtain any permitted wheel configuration. For example, in broadside applications on level land it is common to have coordination of all four wheels to facilitate short turning radio and minimal tracking. Crab steering, however, angles all wheels in the same direction. This is especially useful in counteracting downhill drift when operating in sidehill conditions. Crab steering would be normally performed by means of the steering wheel, as hereinabove described, although the operator would always have the option to independently adjust the steering of each wheel by means of the manual override. In addition, while not shown in FIG. 21, it will be understood that the differential amplifiers 208 and 208' would be switched out of the circuit while the manual control is in effect.

Having turned the wheels to permit travel of the vehicle 30 in the direction of the arrow 63, the switch 210 would then be operated to selectively switch predetermined ones of the bridge null terminals between selected input terminals of the differential amplifiers 208 and 208' to effect four-way steering. Reference to FIG. 21 thus shows that the bridge terminal B is switched from the (+) input of the differential amplifier 208 when the vehicle 30 is steered in the direction of the arrow 62, to a corresponding (+) input in the differential amplifier 208' when the vehicle is steered in the direction 63. Correspondingly, the bridge terminal C is switched from the (−) input terminal on the differential amplifier 208 to the corresponding (−) input terminal on the differential amplifier 208. The net result of this interchange is that bridge terminals B and C are interchanged. Electrically, this results in a recombination of potentiometers for the broadside steering direction which is required to maintain the same resistance ratio between control and corresponding wheel potentiometers when changing the direction of the wheels by 90°. In this regard, it will be understood that diagonally opposing wheels (41, 42' and 41', 42) are adapted to pivotally rotate in the same direction outside of their respective struts when going from a broadside to an endwise configuration and vice versa. The reverse gears 39 and 39' of FIG. 2 would then be automatically actuated to maintain uniformity in the rolling diirection of all wheels. Reference to FIG. 21 shows, however, that steering occurs via pairs of wheels in tandem resulting in crab steering for all four wheels when in the broadside configuration. Accordingly, steering locks would not normally be used in this mode of operation.

It will be apparent to those skilled in the art that the embodiments hereinabove described may be substantially varied to meet specialized and other requirements without departing from the spirit and scope of the invention. For example, hydraulic wheel drive means may be used in place of the mechanical drive train described. Thus, in a hydraulic system the reverse gears 39 and 39' could be replaced with hydraulic fluid flow reversing valves. Additionally, hydraulic rams may replace the solenoids 88. Moreover, steering control may be enhanced using variable speed controls on individual wheels instead of the system hereinabove described.

The embodiments hereinabove described could also be simplified by omitting the reverse gears and reversing valves, provided that all of the wheel struts on the vehicle 30 are adapted to turn in the same direction when changing from an endwise direction of travel to a broadside direction. This would provide the required uniformity in the rolling direction of all wheels. An ensuing further benefit relates to maintaining uniformity of all wheel rotations for proper functioning of tire treads since most agricultural propulsion tires have a chevron type tread which functions best in one direction, namely with the point of the chevron leading.

Another variation, similar to the embodiment of FIG. 19, would include a second vehicle 30' having four wheels instead of the two wheels illustrated. Joined by means of a trailer hitch, both vehicles would then be articulately connected. And, a suitable override control for the circuit 186 would allow the vehicles to negotiate sharp turns as when gaining access to a field from a roadway, an essential feature when maneuvering vehicles exceeding fifty feet in length.

The embodiments disclosed are therefore not to be taken as limiting but rather as exemplary structures of the invention which is defined by the claims appended hereto.

What is claimed is:

1. An agricultural work vehicle having an extensible load supportive frame, an operator's cab rotatably mounted on the frame and adapted to face the direction of travel, motive power means carried by the frame and ground engaging wheel means selectively controllable from the cab and drivable by the power means for rollably supporting the frame, comprising:
   a fixed frame member having a coplanar first sleeve portion;
   a slidable frame member having a longitudinal arm portion adapted to slidably engage the sleeve;
   an articulated frame member hingedly connected with individual ones of the fixed and slidable frame members in the plane of the sleeve and extending orthogonally thereto; and
   hydraulic ram means controllable from the cab for interconnecting and mutually displacing the fixed and slidable frame members, thereby altering the dimensions of the frame.

2. A vehicle as claimed in claim 1, wherein each articulated frame member includes a coplanar second sleeve portion adapted to slidably receive a lateral extension frame member.

3. A vehicle as claimed in claim 2, further comprising a lateral extension frame member slidably disposed in each second sleeve and wherein the hydraulic ram means include means controllable from the cab for separately interconnecting and mutually displacing each articulated frame member with its corresponding lateral extension frame member.

4. A vehicle as claimed in claim 1 wherein individual ones of the fixed and slidable frame members further comprise an orthogonally extending fixed lateral frame member disposed alongside a corresponding articulated frame member to define a load supportive central frame portion that is adjustable in width.

5. A vehicle as claimed in claim 4, further comprising hydraulic stabilizer means interconnected between respective ones of the articulated frame members and the corresponding fixed and slidable frame members for distributing frame load and damping the excursions of the articulated frame members when traversing uneven terrain.

6. A vehicle as claimed in claim 5, wherein the motive power means comprises:
   internal combustion engine means operably controllable from the cab;
   transmission means having an output and an input adapted to be coupled to an output shaft of the engine means, the transmission means being operably controllable from the cab;
   clutch means operably controllable from the cab for selective connection of the transmission means input to the output shaft; and
   drive shaft means coupling motive power from the transmission means output to the wheel means.

7. A vehicle as claimed in claim 6, wherein the wheel means comprises:
   a depending, hollow wheel strut rotatably journalled in at least one extension frame member adjacent a free end thereof and in corresponding ones of the fixed and slidable frame members at an intersection of the long axes of the first and second sleeves;
   a gear case closing the lowermost end of the strut;
   a ground engaging wheel rotatably mounted on a side wall of the gear case facing outwardly of the frame; and
   gear means operably disposed in the gear case with an input and output thereof rotatably connected to the drive shaft means and wheel respectively.

8. A vehicle as claimed in claim 7, wherein the wheel means further comprises:
   a steering motor fixedly mounted on each respective frame member adjacent its wheel strut;
   a sector gear fixedly mounted on a circumferential portion of each strut adjacent an output shaft of its steering motor;
   a worm gear fixedly mounted on the output shaft in rotatable, gear engaging relation with the sector gear;
   a common source of driving power for each steering motor; and
   control means for selectively controlling individual ones of the steering motors from the cab.

9. A vehicle as claimed in claim 8, wherein the wheel means further comprises:
   locking means for individual ones of the wheel struts, the locking means being selectively energizable by the control means for locking a wheel in a predetermined steering position.

10. A vehicle as claimed in claim 9, wherein the wheel means further comprises:
    a sensor fixedly mounted on each respective frame member adjacent its strut and rotatably coupled to the strut for sensing the degree of rotation of the strut relative to its frame member; and
    indicator means disposed in the cab and connected to individual ones of the sensors for indicating the respective rotary positions of the wheel struts.

11. A vehicle as claimed in claim 10, wherein the gear means comprises:
    a wheel axle journalled in the side wall of the gear case with one end of the axle being adapted to mount the wheel and the other end having mounted thereon a crown gear; and
    a pinion gear rotatably connected to the drive shaft means and operatively engaging the crown gear.

12. A vehicle as claimed in claim 10, wherein the gear means comprises:
    a first wheel axle rotatably journalled in the side wall of the gear case with one end of the axle being adapted to mount the wheel and the other end being rotatably connected to a differential gear housed in the gear case;

a second wheel axle rotatably journalled in the opposite side wall of the gear case in coaxial relation with the first wheel axle, one end of the second wheel axle being adapted to mount a second wheel and the other end being rotatably connected to the differential gear; and a stub shaft rotatably journalled in a side wall of the gear case orthogonally to the first and second wheel axles with one end of the stub shaft connected to the drive shaft means and the other end drivably connected to the differential gear.

13. A vehicle as claimed in claim 12, further comprising a second wheel mounted on the second wheel axle.

14. A vehicle as claimed in claim 6, wherein the drive shaft means comprises:

drive shaft having at least one universal joint connected to a first output shaft of the clutch means;

a first differential gear having an input shaft connected to the free end of the first drive shaft, a first output shaft rotatably connected with a strut shaft of a first wheel strut and a second output shaft rotatably connected with a strut shaft of a second wheel strut;

a second drive shaft having at least one universal joint connected to a second output shaft of the clutch means;

a second differential gear having an input shaft connected to the free end of the second drive shaft, a third output shaft rotatably connected to a strut shaft of a third wheel strut and a fourth output shaft rotatably connected to a strut shaft of a fourth wheel strut.

15. A vehicle as claimed in claim 10, wherein the locking means comprises:

a solenoid having a case fixedly attached to a frame member adjacent a wheel strut, a plunger slidably disposed within the case and extending outwardly therefrom when the solenoid is energized; and a plurality of apertures circumferentially disposed in series relation in the wheel strut adjacent the plunger with individual ones of the apertures being alignable with the plunger to receive same when the solonoid is energized, thereby locking the wheel strut in a predetermined position.

16. A vehicle as claimed in claim 7, further comprising hitch means mounted on a side wall of at least one of the fixed and slidable frame members for selectively lifting, tilting and drawing an agricultural implement:

17. A vehicle as claimed in claim 16, wherein the hitch means comprises:

a vehicle mounting frame;

a drawbar and lift frame;

drawbar means pivotally interconnecting the mounting and drawbar and lift frames at each side thereof to minimize side sway;

a pair of lower hooks disposed on the free side of the drawbar and lift frame for quick attachment to a pair of corresponding pins on the implement;

a pair of corresponding upper hooks; and hydraulic means pivotally linking the frames of the hitch means controllably from the cab for selectively lifting, tilting and drawing the implement.

18. A vehicle as claimed in claim 17, wherein draft forces exerted through the drawbar means intersect at a point ahead of the trailing pair of wheels to add weight to the front wheels for improved traction and steering control.

19. A vehicle as claimed in claim 7, further comprising hitch means for hitching and lifting a mid-mounted cultivator implement under the load supportive frame.

20. A vehicle as claimed in claim 19, wherein the hitch means comprises:

a vehicle mounting frame;

a pair of drawbar brackets disposed in spaced relation cn the free side of the mounting frame, each bracket having a wide end pivotally connected to the mounting frame for minimizing side sway and a narrow end for pivotal connection to a drawbar of the implement;

a pair of sheaves rotatably mounted on the frame members in spaced relation corresponding to the drawbar brackets;

a chain having one end joined to the wide end of individual ones of the drawbar brackets with the free end of the chain entrained about a corresponding sheave and depending therefrom for connection to a beam of the implement; and second hydraulic ram means pivotally joined intermediate the mounting frame and individual ones of the drawbar brackets and operably controllable from the cab for adjusting the working depth of the implement and to lift the implement for transport.

21. A vehicle as claimed in claim 7, further comprising lift rail means disposed on the central frame portion for loading and carrying apparatus including a combine body, seeder tank, spray tank and a pallet box.

22. A vehicle as claimed in claim 21, further comprising locking apparatus separately disposed on the apparatus to be carried and the fixed lateral frame members, the locking apparatus being remotely controllable from the cab to secure locking engagement between the vehicle and said apparatus.

23. A vehicle as claimed in claim 22, wherein the lift rail means comprises:

a pair of fixed brackets depending in spaced relation from individual ones of the fixed lateral frame members;

a first pivot shaft rotatably journalled in individual ones of the fixed brackets;

a hanger strap having one end attached to individual ones of the first pivot shafts;

a second pivot shaft attached to individual ones of the free ends of the hanger straps;

an angle beam having bearing portions in which are rotatably journalled individual ones of the second pivot shafts of each fixed lateral frame member, each angle beam facing the apparatus to be carried and adapted to engage a corresponding rail attached thereto;

a torque strap having one end attached to one of the first pivot shafts on each angle beam; and third hydraulic ram means opeably controllable from the cab and pivotally attached intermediate the torque straps and fixed lateral frame members whereby actuation of the ram means results in mutual vertical displacement of the angle beam.

24. A vehicle as claimed in claim 23, wherein the locking apparatus comprises:

a lock rod rotatably journalled on the apparatus to be carried;

a wedge shaped lock member attached to both ends of the lock rod in mutually aligned relation;

a wedge shaped lock receiver rotatably mounted on individual ones of the fixed lateral frame members in alignment with individual ones of the lock members and adapted to slidably nest and release the lock member when aligned with its receiver; and hydraulic actuator means rotatably connected to the lock receiver and remotely controllable from the cab whereby rotation of the nested lock and receiver to a downward direction locks the carried apparatus to the vehicle and ties together the fixed lateral frame members to form a strong box-like structure.

25. A vehicle as claimed in claim 7, further comprising:

a second aqricultural work vehicle;

means joining the vehicles in flexible adjacent relation;

gauge means for detecting mechanical strains in the joining means;

a measuring bridge for generating a composite signal responsive to the detected strains;

circuit means for producing a control signal in response to the composite signal; and control means responsive to the control signal for regulating engine speed of the second vehicle to minimize mechanical strains in the joining means.

26. A vehicle as claimed in claim 11, wherein the steering motors are hydraulically operated, the common source of driving power comprises a source of pressurized hydraulic fluid and the control means for the motors comprises solenoid valves controlled by circuit means responsive to the respective rotary positions of the wheel struts and a steering wheel for the vehicle.

27. A vehicle as claimed in claim 26, wherein the circuit means includes a differential amplifier having a first input signal corresponding to the rotary position of one wheel strut and a second input signal corresponding to the rotary position of the steering wheel, the amplifier producing a control signal in response to an unbalanced input that selectively energizes the solenoid valves to actuate at least one of a pair of the steering motors until a balanced input is restored.

28. A vehicle as claimed in claim 27, further comprising valve means responsive to the wheel lock control circuit for selectively inhibiting the flow of pressurized hydraulic fluid to the steering motors of the pair of trailing wheels.

29. A vehicle as claimed in claim 28, further comprising switch means for selectively switching predetermined ones of first and second input signals to the differential amplifier to effect four-way steering.

30. A vehicle as claimed in claim 7 wherein the wheel includes a tire having a pair of beads of substantially unequal circumference.

31. A vehicle as claimed in claim 17 wherein the hydraulic means are capable of tilting the implement 90° for narrower transport.

32. A vehicle as claimed in claim 25 wherein the wheel means further comprises:

a depending, hollow wheel strut rotatably journalled in each extension frame member adjacent a free end thereof and in respective ones of the fixed and slidable frame members.

33. A vehicle as claimed in claim 25 wherein the wheel means comprises:

a depending, hollow wheel strut rotatably journalled in one extension frame member adjacent a free end thereof and in a corresponding one of the fixed and slidable frame members.

34. A vehicle as claimed in claim 32 wherein the joining means comprises a trailer hitch for articulately connecting the first and second vehicles and further comprising means for overriding the engine speed control means to enable the vehicles to negotiate sharp turns.

35. A vehicle as claimed in claim 33 wherein the joining means comprises hinges.

* * * * *